United States Patent [19]

Makita

[11] Patent Number: 4,565,108
[45] Date of Patent: Jan. 21, 1986

[54] GEARSHIFT APPARATUS FOR AN AUTOMOBILE

[75] Inventor: Fujio Makita, Hachioji, Japan

[73] Assignee: Fuji Jukogyo Kabushiki Kaisha, Tokyo, Japan

[21] Appl. No.: 524,947

[22] Filed: Aug. 22, 1983

[30] Foreign Application Priority Data

Sep. 1, 1982 [JP] Japan .................................. 57-153042

[51] Int. Cl.⁴ ............................................. B60K 20/00
[52] U.S. Cl. ........................................ 74/475; 74/339; 192/21.5
[58] Field of Search ................... 74/475, 339; 192/21.5

[56] References Cited

U.S. PATENT DOCUMENTS

| 2,223,649 | 12/1940 | Wagner | 74/475 |
| 3,088,565 | 5/1963 | Jaeschke | 192/21.5 |
| 3,866,488 | 2/1975 | Nakata et al. | 74/475 |
| 4,174,644 | 11/1979 | Nagy et al. | 74/475 |
| 4,365,522 | 12/1982 | Kubota et al. | 74/475 |

Primary Examiner—Ronald C. Capossela
Attorney, Agent, or Firm—Martin A. Farber

[57] ABSTRACT

A gearshift apparatus for an automobile with an electromagnetic powder clutch and a transmission having four forward-gear trains. The apparatus comprises a first synchronizing device for selectively engaging a second speed gear and a fourth speed gear with an output shaft of the transmission, a second synchronizing device for selectively engaging a first speed gear and a third speed gear with the output shaft, a shift lever for operating the first synchronizing device and the second synchronizing device. An actuating rod is provided for operatively connecting the shift lever with the first and second synchronizing devices. The shift lever is rotatably supported on a holding lever which is rotatably about an axis. The axis is substantially coaxial with the actuating rod. The holding lever is held in a range for operating the first synchronizing device and a range for operating the second synchronizing device by engagement of a spring loaded ball and in grooves.

7 Claims, 9 Drawing Figures

GEARSHIFT APPARATUS FOR AN AUTOMOBILE

BACKGROUND OF THE INVENTION

The present invention relates to a gearshift apparatus for an automobile with an automatic clutch such as an electromagnetic powder clutch.

An electromagnetic powder clutch for an automobile comprises an annular drive member secured to a crankshaft of an engine, a magnetizing coil provided in the drive member, a driven member secured to an input shaft of a transmission spaced from the drive member, magnetic powder provided in the space between the drive and driven members, and a shift lever for changing gears in the transmission. The shift lever is provided with a tiltable knob and switches. The knob is tilted with respect to the shift lever by a force applied through the driver's hand, when the shift lever is shifted. The switches are actuated by the knob for controlling the electric current flowing through the magnetizing coil. As an accelerator pedal is depressed, the clutch current passing through the coil increases. The magnetic powder is aggregated in the gap between the drive member and the driven member, so that the driven member is coupled to the drive member. Thus, the automobile can be smoothly started by suitably depressing the accelerator pedal by slipping of both members of the clutch. Such system is disclosed in a plurality of patent publications, for example, in Japanese patent laid-open specification No. 56-60733.

Today, many cars are equipped with four-speed transmissions. Accordingly, the shift lever must be shifted along an H-shaped shift pattern for forward driving. Although no clutch pedal operation is required for driving the automobile provided with an electromagnetic powder clutch, the driver is not yet free from complex shift lever operation. On the other hand, since the electromagnetic powder clutch can be designed to have a long period of partial engagement by controlling the clutch current, the automobile can be started by a second speed gear of the transmission with such a long partial engagement. Therefore, it is possible to drive the automobile only by the second speed and fourth speed gears. Accordingly, the present invention has proposed to divide four forward-gear sets trains of the transmission into two groups, that is a high power transmission system comprising first speed and third speed gears and a low power transmission system comprising second speed and fourth speed gears. On an ordinary road, the automobile can be driven by the low power transmission system, and when high power is required as uphill driving, the high power transmission system is used.

SUMMARY OF THE INVENTION

An object of the present invention is to provide a gearshift apparatus for the above described transmission which can be simply manipulated by a shift lever.

According to the present invention, there is provided a gearshift apparatus for an automobile with an electromagnetic clutch and a transmission having four forward-gear sets, comprising: a first synchronizing device for selectively engaging a second speed gear and a fourth speed gear with an output shaft of said transmission, said sicond speed gear having a gear ratio producing a sufficient torque to start said automobile; a second synchronizing device for selectively engaging a first speed gear and a third speed gear with said output shaft; a shift lever for operating said first synchronizing device and said second synchronizing device;

means for holding said shift lever in a range for operating said first synchronizing device and in a range for operating said second synchronizing device, respectively, and an actuating rod for operatively connecting said shift lever with said first and second synchronizing devices.

Other objects and features of the present invention will be more apparent from the following description with reference to the accompanying drawings.

DETAILED DESCRIPTION OF THE PREFERRED EMBODIMENT

Figures 1, 2:
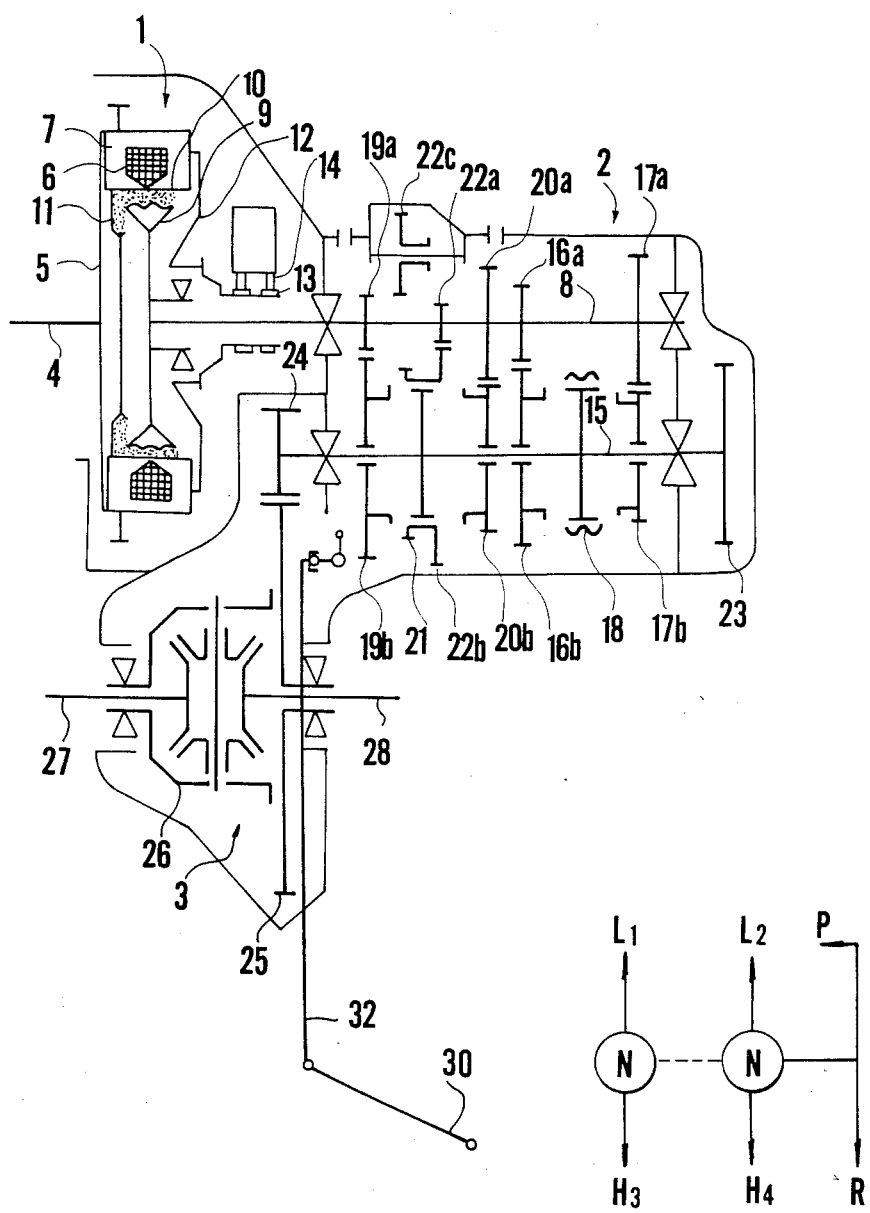
FIG. 1 is a sectional view of a transmission with an electromagnetic powder clutch, in which an apparatus according to the present invention is provided.
FIG. 2 shows a gearshift pattern in the transmission of FIG. 1.

Referring to FIG. 1 showing a transmission dependent on the present invention, an electromagnetic powder clutch is generally designated by a reference numeral 1. A four-speed transmission 2 is operatively connected to the clutch 1, which in turn is connected to a final reduction device 3.

The electromagnetic powder clutch 1 is provided in a clutch case and comprises a drive plate 5 attached to the end of a crankshaft 4 of an internal combustion engine (not shown), an annular drive member 7 secured to the drive plate 5, a clutch coil 6 provided in the drive member 7, and a driven member 9 secured by a spline engagement to an input shaft 8 of the transmission 2, spaced from the drive member 7 leaving a gap 10. Magnetic powder material is provided in a powder chamber 11 and the gap 10 is adapted to be filled with the powder. A cover 12 is secured to the drive member 7. The cover 12 has a cylindrical portion coaxial with the input shaft 8, on which slip rings 13 are securely provided. The slip rings 13 are connected to the coil 6 by leads, and brushes 14 are pressed against the slip rings 13.

In such construction, the drive plate 5 and the drive member 7 rotate together with the crankshaft 4 and the magnetic powder sealed into the powder chamber 11 is drawn on the inner surface of the drive member 7 by centrifugal force. If the coil 6 is excited, the drive member 7 is magnetized to produce a magnetic flux passing through the driven member 9. Thus, the powder is aggregated in the gap 10, so that the power of the engine is transmitted to the input shaft 8 through the clutch.

In the transmission 2, first to fourth speed gear sets are provided. In accordance with the present invention, the speed speed gear set (train) and fourth speed gear set (train) are adjacent each other for providing a low power transmission system, and first speed gear set (train) and third speed gear set (train) are adjacent for a high power transmission system. The second speed gear set comprises a second speed drive gear 16a jointly rotatably mounted on the input shaft 8 and a second speed driven gear 16b engaged with the drive gear 16a and rotatably mounted on an output shaft 15. The fourth speed gear set comprises a drive gear 17a jointly rotatably mounted on the input shaft 8 and a driven gear 17b rotatably mounted on the output shaft 15. Between the driven gears 16b and 17b, a sychronizing device 18 for the low power transmission system is mounted on the output shaft 15 in order to engage selectively the driven gears 16b and 17b with the output shaft 15 for joint rotation. Similarly, the first speed gear set comprising a drive gear 19a and a driven gear 19b is adjacent the third speed gear set comprising a drive gear 20a and a driven gear 20b. A synchronizing device 21 for the high power transmission system is provided between the driven gears 19b and 20b. The second speed gear set and the first speed gear set are located on the same sides (in the left direction) of synchronizing devices 18 and 21 and the third speed gear set and fourth speed gear set are located on the opposite side (right direction) of the respective synchronizing device.

A reverse drive gear 22a is jointly rotatably mounted on the input shaft 8 and a driven gear 22b is formed on one side of a sleeve of the synchronizing device 21. An idler gear 22c is adapted to be engaged with the gears 22a and 22b for the reverse drive. Further, a parking gear 23 is formed on one end of the output shaft 15 for locking the drive power transmission system during the parking of the car.

The gear shift pattern of a shift lever of the transmission is shown in FIG. 2, where "$L_1$", "$L_2$" indicate 1st speed and 2nd speed positions. "$H_3$", "$H_4$" indicate 3rd speed and 4th speed positions, "N" is a neutral position, and "P" and "R" are parking and reverse positions, respectively. The line connecting the "$L_1$" and "$H_3$" is a high power transmission pattern and the line connecting the "$L_2$" and "$H_4$" is a low power transmission pattern.

Further, provided on an end of the output shaft 15 is an output gear 24 which is engaged with a ring gear 25 of a differential 26 of the final reduction device 3 to transmit the output of the output shaft 15 to driving wheels (not shown) of the vehicle through wheel shafts 27 and 28.

Figure 3:
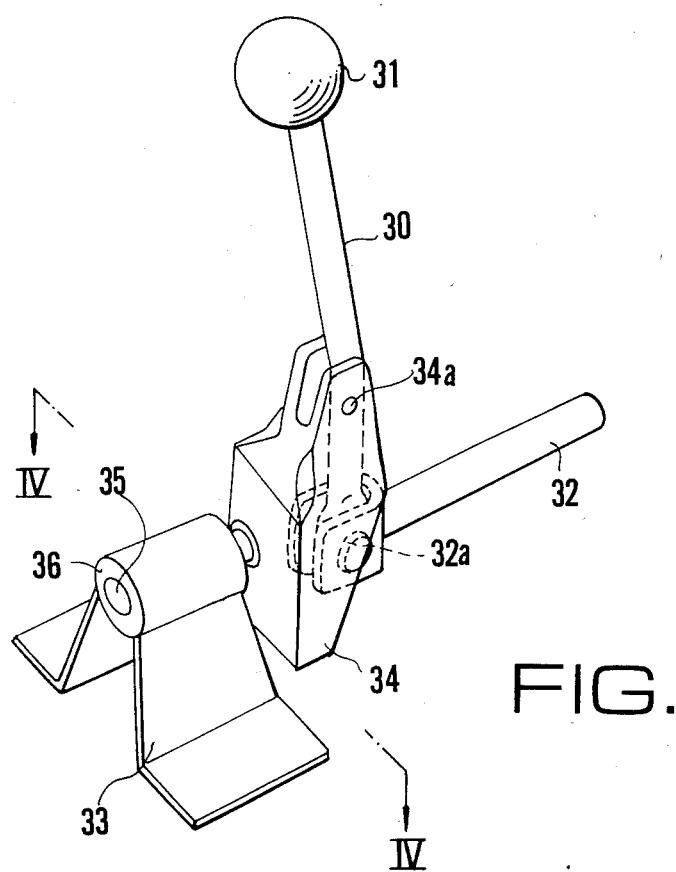
FIG. 3 is a perspective view showing a shift lever and a part of a shift mechanism.

Referring to FIG. 3, a shift lever 30 is rotatably supported on a holding lever 34 by a pin 34a so as to be shifted on a straight line in the longitudinal direction of the automobile. A knob 31 is attached to an upper portion of the shift lever 30 and an end of an actuating rod 32 is connected at a lower portion of the shift lever by a pin 32a. The holding lever 34 is mounted on a horizontal shaft 35 which is substantially coaxial with the actuating rod 32. The horizontal shaft 35 is rotatably supported in a bearing 36 secured to a floor of the automobile by a bracket 33.

Figure 4:
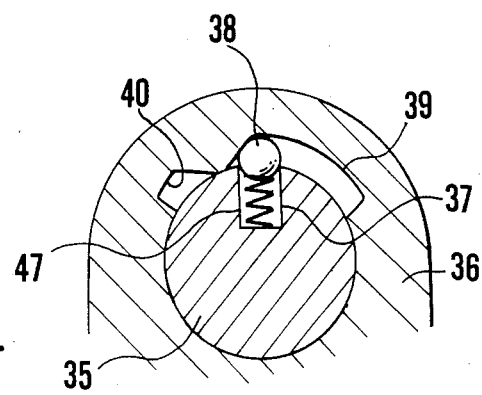
FIG. 4 is a sectional view taken along the line IV—IV of FIG. 3.

As shown in FIG. 4, inside grooves 39 and 40 are formed in the inside wall of the bearing 36. A ball 38 is engaged in a bore 37 radially provided in the shaft 35 and is urged against the bearing 36 so as to engage with one of grooves 39 and 40. The engagement of the ball 38 with the groove 40 holds the shaft 35, that is the shift lever, in the high power transmission gearshift range (the $L_1$ and $H_3$ alignment of FIG. 2). The groove 39 is so formed as to keep the shift lever in the gearshift range of the low power transmission (the $L_2$ and $H_4$ alignment of FIG. 2) or in the reverse-and-parking (the R and P alignment of FIG. 2). The holding lever 34 is held in a neutral position of the low power transmission shift range by a spring (not shown).

Figure 8:
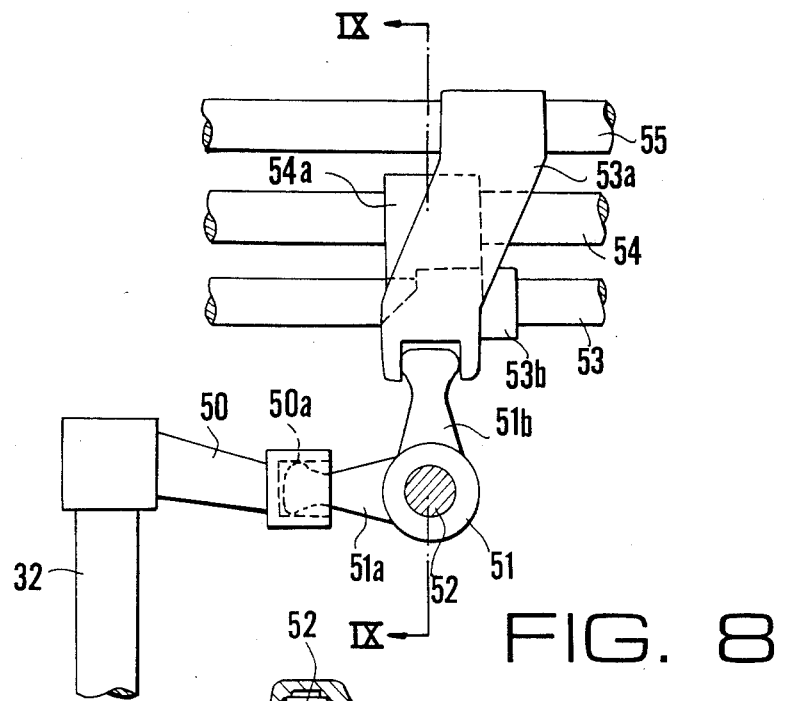
FIG. 8 is a plan view showing a select device.
Figure 9:
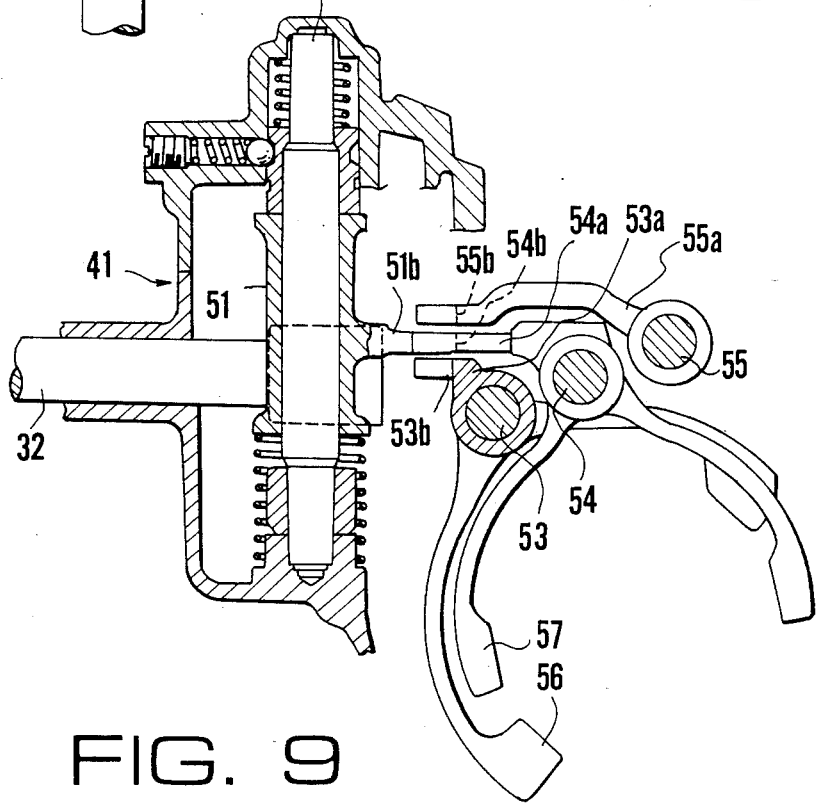
FIG. 9 is a sectional view taken along the line IX—IX of FIG. 8.

The other end of the actuating rod 32 is operatively connected to a gear select device 41. As shown in FIGS. 8 and 9, the select device 41 comprises an arm 50 secured to the actuating rod 32, and a select lever 51 rotatably and slidably mounted on a shaft 52. The select lever 51 has arms 51a and 51b, and the end of the arm 51a engages with a recess 50a formed in the end of the arm 50. The end of the arm 51b is adapted to be selectively engaged with one of forks 53b, 54b and 55b of shifter arms 53a, 54a and 55a. The shifter arms are secured to shifter rails 53, 54 and 55, respectively. The shifter rail 53 is for the 1st and 3rd speeds and adapted to operate the synchronizing device 21 with a fork 56, the shifter rail 54 is for the 2nd and 4th speeds and adapted to operate the synchronizing device 18 by a fork 57, and the shifter rail 55 is for the reverse and parking and adapted to operate the idler gear 22c and the parking gear 23. Such a select device per se is well-known.

In the transmission of the present invention, the gear ratio of the second speed gear set is designed to produce a sufficient torque to start the automobile, and the second gear ratio and fourth gear ratio are such that the automobile can be driven by second and fourth gears on only flat roads. On the other hand, first and third gears on designed to get sufficient torque to drive the automobile on hills.

Figure 6:
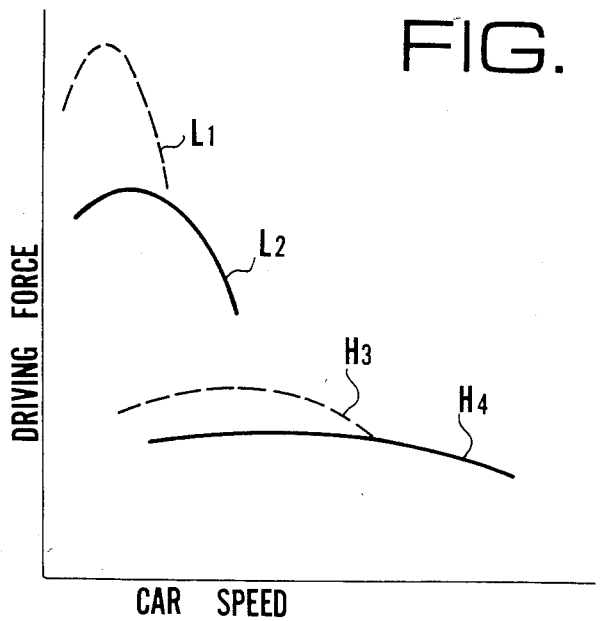
FIG. 6 is a graph showing a relationship between car speed and driving force.

FIG. 6 shows the relationship between the car speed and driving force by the four gear trains. In order to enable the transmission to drive the automobile by two gear trains, the gear ratios of the first and second gear trains ($L_1$, $L_2$ positions) approximate each other and also the gear ratios of the third and fourth gear trains ($H_3$, $H_4$ positions) are approximate, as shown in the graph. On the other hand, the difference between the gear ratios of the two gear trains (corresponding to the $L_1$, $H_3$ and $L_2$, $H_4$ positions respectively) is considerably large. Such a large difference of gear ratios will cause jerking and stumbline of the automobile, if the clutch is rapidly engaged. Therefore, in the system, the clutch is so arranged as to gradually engage with a partial engagement.

Figure 5:
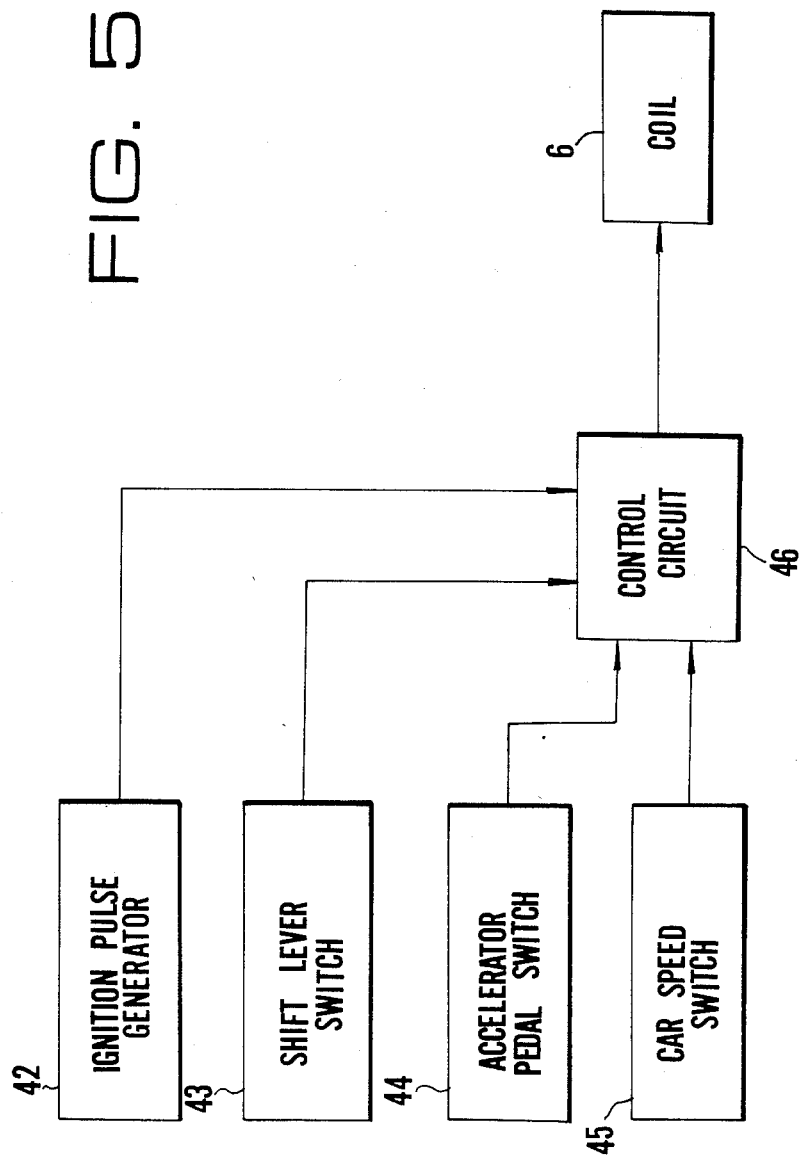
FIG. 5 shows a block diagram of a clutch current control system.
Figure 7:
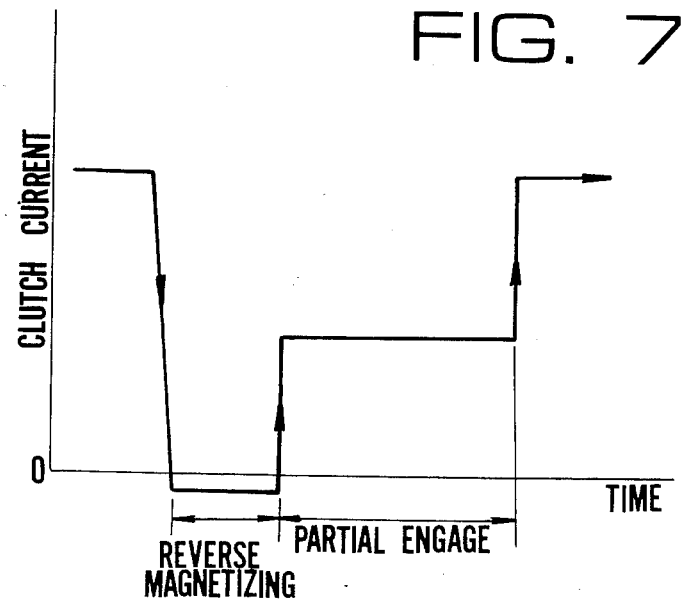
FIG. 7 is a graph showing a clutch current variation.

FIG. 5 shows a clutch current control system for providing a partial engagement period in the clutch engaging period. The system comprises an ignition pulse generator 42, a shift lever switch 43 which is mounted on the knob 31 and adapted to be closed when operating force is exerted on the knob, an accelerator pedal switch 44, a car speed switch 45, and a control circuit 46. The control circuit 46 operates in response to input signals applied thereto and controls clutch current flowing through the coil 6. The clutch current varies stepwise as shown in FIG. 7. When the shift lever 30 is shifted, the clutch current flows in the inverse direction to magnetize the drive member 7 in the opposite polarity to remove the residual magnetism. After the shift lever has been shifted, a low clutch current flows through the coil for partially engaging the clutch for a relatively long time. After that, a rated current flows to entirely engage the clutch.

In operation, when the shift lever 30 is positioned in the intermediate position, the shift lever is held in the neutral position in the low power transmission gear shift range, which is the state shown in FIG. 4. In this position, the arm 51b engages with the fork 54b of the shifter arm 54a. Thus, by shifting the shift lever 30 fore and aft in the low power transmission gearshift range ($L_2$, $H_4$), the synchronizing device 18 is operated to engage the second speed gear set 16a, 16b or the fourth speed gear set 17a, 17b with the output shaft 15.

Thus, the automobile can be driven by shifting the shift lever 30 on the straight line (actually a small arc) about the pivot pin 34a by the low power transmission system. If the shift lever 30 is shifted to the right or clockwise (in FIGS. 2, 3 and 4) within the groove 39, the shift lever is located in the reverse-and-parking shift range. Accordingly, the reverse gear set including the idler gear 22c or parking 23 gear can be engaged by operating the shaft lever about the pivot pin. When the shift lever is shifted to the left or clockwise (in FIGS. 2-4) into a different plane, the ball 38 engages with the groove 40 and the shift lever is held in the high power transmission gear shift range. Thus, the automobile can be driven by the high power transmission system by operating the shift lever in the straight line ($L_1$-N-$H_3$, in FIG. 2) (actually a small arc) about the pivot pin 34a.

From the foregoing it will be understood that the present invention provides a gear shift apparatus for a transmission which is divided into a high power transmission system ($L_1$-N-$H_3$) and a low power transmission ($L_2$-N-$H_4$), which is simply manipulated.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A gearshift apparatus for an automobile with an electromagnetic clutch and a transmission operatively connected to the clutch and having four forward-gear trains and an output shaft, comprising:

a first synchronizing means for selectively engaging a second speed gear train and a fourth speed gear train, respectively, with the output shaft of said transmission, said second speed gear train having a gear ratio producing a sufficient torque to start said automobile on an ordinary road;

a second synchronizing means for selectively engaging a first speed gear train and a third speed gear train, respectively, with said output shaft, the first speed gear having a gear ratio producing a sufficient torque to start the automobile on an uphill and at heavy road, respectively, means comprising a shift lever for operating said first synchronizing means and said second synchronizing means, respectively;

said shaft lever being mounted so as to be rotated to a first plane for operating said first synchronizing means and rotated to a second plane for operating said second synchronizing means;

means for holding said shift lever in said first and second planes, respectively, for enabling operating said first synchronizing means and for enabling operating said second synchronizing means, respectively by said shift lever and;

a gear select means including a select lever selectively operatively engagable with one of said synchronizing means by rotation of said shift lever to respective of said planes, and an actuating rod operatively connecting said shift lever with said select lever for operating one of said first and second synchronizing devices respectively by movement of said shift lever.

2. The gearshift apparatus for an automobile according to claim 1, wherein said electromagnetic clutch is an electromagnetic powder clutch.

3. The gearshift apparatus according to claim 1 wherein
   said holding means comprises
   a holding lever for holding said shift lever so said shift lever is pivotal about a first pivot axis,
   a shaft secured to said holding lever, a bearing for rotatably supporting said shaft about an axis substantially perpendicular to said first pivot axis said shaft being substantially coaxial with said actuating rod,
   means including a spring loaded ball and grooves for engaging said shaft with said bearing by engagement between said spring loaded ball and grooves.

4. The apparatus according to claim 1, wherein
   said electromagnetic clutch comprises means for partial engagement of the clutch.

5. The apparatus according to claim 4, wherein
   said first synchronizing means is axially displaceably mounted on said output shaft between said second speed gear train and said fourth speed gear train, and
   said second synchronizing means is axially displaceably mounted on said output shaft between said first speed gear train and said third speed gear train.

6. A gearshift apparatus for an automobile with an electromagnetic clutch and a transmission operatively connected to the clutch and having four forward-gear trains and an output shaft, comprising:

a first synchronizing means for selectively engaging a second speed gear train and a fourth speed gear train, respectively, with the output shaft of said transmission, said second speed gear train having a gear ratio producing a sufficient torque to start said automobile on an ordinary road;

a second sychronizing means for selectively engaging a first speed gear train and a third speed gear train, respectively, with said output shaft, the first speed gear having a gear ratio producing a sufficient torque to start the automobile on an uphill and at heavy road, respectively, means comprising a shift lever for operating said first synchronizing means and said second synchronizing means, respectively;

said shift lever being mounted so as to be rotated to a first plane for operating said first synchronizing means and rotated to a second plane for operating said second synchronizing means substantially along a straight line in respective of said planes, said straight lines being substantially parallel to each other; and said first, second, third and fourth speed gear trains have respectively decreasing gear ratios in the named order.

7. A gearshift apparatus for an automobile with an electromagnetic clutch and a transmission operatively connected to the clutch and having four forward-gear trains and an output shaft, comprising:

a first synchronizing means for selectively engaging a second speed gear train and a fourth speed gear train, respectively, with the output shaft of said transmission, said second speed gear train having a gear ratio producing a sufficient torque to start said automobile on an ordinary road;

a second synchronizing means for selectively engaging a first speed gear train and a third speed gear train, respectively, with said output shaft, the first speed gear having a gear ratio producing a sufficient torque to start the automobile on an uphill and at heavy road, respectively, means comprising a shift lever for operating said first synchronizing means and said second synchronizing means, respectively;

said shift lever being mounted so as to be moved to a first plane for operating said first synchronizing means and moved to a second plane for operating said second synchronizing means substantially along a straight line in respective of said planes, said straight lines being substantially parallel to each other; and said first, second, third and fourth speed gear trains have respectively decreasing gear ratios in the named order.

* * * * *